US007552017B1

(12) United States Patent
Baker et al.

(10) Patent No.: US 7,552,017 B1
(45) Date of Patent: Jun. 23, 2009

(54) TAILPULSE SIGNAL GENERATOR

(75) Inventors: John Baker, Walnut Creek, CA (US);
Daniel E. Archer, Knoxville, TN (US);
Stanley John Luke, Pleasanton, CA
(US); Daniel J. Decman, Livermore, CA
(US); Gregory K. White, Livermore,
CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 376 days.

(21) Appl. No.: 11/544,146

(22) Filed: Oct. 6, 2006

Related U.S. Application Data

(60) Provisional application No. 60/725,128, filed on Oct. 6, 2005.

(51) Int. Cl.
*G01R 13/00* (2006.01)
(52) U.S. Cl. ...................................... 702/66; 250/252.1
(58) Field of Classification Search ..................... 702/66
See application file for complete search history.

(56) References Cited

U.S. PATENT DOCUMENTS 4,658,222 A    4/1987  Wolf et al.
6,160,259 A *  12/2000 Petrillo et al. ........... 250/363.07
7,180,055 B1 *  2/2007 Kallenbach et al. ...... 250/252.1

OTHER PUBLICATIONS

"A Random Tail Pulse Generator", D.W. Burtis and D. Brown, IEEE Transactions on Nuclear Science, vol. 20 Issue 1, 1973.*
Walker, Alastair J. "An Efficient Method for Generating Discrete Random Variables with General Distributions" ACM Trans. on Math Software, Sep. 1977 pp. 253-256, vol. 3:3.

* cited by examiner

*Primary Examiner*—Bryan Bui
*Assistant Examiner*—Johnathan Teixeira Moffat
(74) *Attorney, Agent, or Firm*—James S. Tak; John H. Lee

(57) ABSTRACT

A tailpulse signal generating/simulating apparatus, system, and method designed to produce electronic pulses which simulate tailpulses produced by a gamma radiation detector, including the pileup effect caused by the characteristic exponential decay of the detector pulses, and the random Poisson distribution pulse timing for radioactive materials. A digital signal process (DSP) is programmed and configured to produce digital values corresponding to pseudo-randomly selected pulse amplitudes and pseudo-randomly selected Poisson timing intervals of the tailpulses. Pulse amplitude values are exponentially decayed while outputting the digital value to a digital to analog converter (DAC). And pulse amplitudes of new pulses are added to decaying pulses to simulate the pileup effect for enhanced realism in the simulation.

8 Claims, 7 Drawing Sheets

```
union {
    // f array message struct follows
    struct {
        char     startChar1;
        char     startChar2;
        UINT16   command;

ULONG    messageLength;

ULONG    iData[NCHAN];

UINT16   spare1;
        UINT8    spare2;
        UINT8    msgChecksum;
    }f;
    // ia array message struct follows
    struct {
        char     startChar1;
        char     startChar2;
        UINT16   command;

ULONG    messageLength;

UINT16   iData[NCHAN];

UINT16   spare1;
        UINT8    spare2;
        UINT8    msgChecksum;
    }ia;
    // command struct follows
    struct {
        char     startChar1;
        char     startChar2;
        UINT16   command;

ULONG    messageLength;

UINT16   spare1;
        UINT8    spare2;
        UINT8    msgChecksum;
    }c;
    // Cal Factor message follows
    struct {
        char     startChar1;
        char     startChar2;
        UINT16   command;

ULONG    messageLength;

ULONG    calFactor;

UINT16   spare1;
        UINT8    spare2;
        UINT8    msgChecksum;
    }cal;
```

Figure 8

```
// Seeds message follows
struct {
   char     startChar1;
   char     startChar2;
   UINT16   command;

ULONG    messageLength;

ULONG    Seed;

UINT16   spare1;
   UINT8    spare2;
   UINT8    msgChecksum;
}s;
// Delay array message follows
struct {
   char     startChar1;
   char     startChar2;
   UINT16   command;

ULONG    messageLength;

ULONG    iDelay[N_DELAY_POINTS];

UINT16   spare1;
   UINT8    spare2;
   UINT8    msgChecksum;
}d;
// test struct follows
struct {
   char     startChar1;
   char     startChar2;
   UINT16   command;

ULONG    messageLength;

// test message follows
   UINT8    testData[NTESTCHARS];

UINT16   spare1;
   UINT8    spare2;
   UINT8    msgChecksum;
}t;
char mChar[TOTALMSGSIZE];
} u;
```

Figure 9

TAILPULSE SIGNAL GENERATOR

I. CLAIM OF PRIORITY IN PROVISIONAL APPLICATION

This application claims the benefit of U.S. provisional application No. 60/725,128 filed Oct. 6, 2005, entitled, "Tailpulse Signal Generator" by John Baker et al.

The United States Government has rights in this invention pursuant to Contract No. W-7405-ENG-48 between the United States Department of Energy and the University of California for the operation of Lawrence Livermore National Laboratory.

II. FIELD OF THE INVENTION

The present invention relates to pulse generators, and more particularly to a tailpulse signal generator/simulator which realistically simulates tailpulse signals produced by a gamma radiation detector by including the randomness of pulse events and the effect of pulse pileup.

III. BACKGROUND OF THE INVENTION

Tailpulses are fast-rising pulse voltages produced by Germanium or scintillator type radiation detector systems when irradiated with gamma photons from radioactive sources, with characteristic rise times of approximately 100 nanoseconds and slow fall times of approximately 100 microseconds, as shown in FIG. 1. For purposes of testing, calibrating, and validating multi-channel analyzers (MCA) used in radiation detection systems, there is a need to artificially generate electronic pulses which mimic or otherwise simulate such tailpulses, since radioactive sources are often not readily available to use for on-location testing of radiation detection equipment, such as for example at ports of entry. Additionally, in order to realistically mimic the tailpulse generation by Germanium and scintillator detectors, pulse amplitudes must vary in a near random pattern and the process of pulse generation must take into account pulse pileup, i.e. the addition or accumulation of tailpulses which takes place when one or more additional tailpulses occur before the previous pulse has decayed, as illustrated in FIG. 2, which is a consequence of random tailpulse timing.

Analog circuits have been used to produce fixed amplitude tailpulses. And commercially available Arbitrary Waveform Generators (AWG's) have also been used. AWG's, however, respond slowly to changes in the pulse timing and amplitude required for mimicking the tailpulses produced by radiation detectors. Additionally, efforts to duplicate the pileup effect, i.e. summation of tailpulses, have been largely unsuccessful.

There is therefore a need for tailpulse generators/simulators capable of producing electronic pulses which realistically simulate tailpulse signals produced by radiation detectors by including the effects of pulse pileup and random or near-random pulse timing.

IV. SUMMARY OF THE INVENTION

One aspect of the present invention includes a tailpulse signal generator comprising: digital signal processor for generating digital tailpulse signals from energy spectrum data including: a first processor module for pseudo-randomly selecting energy values from the energy spectrum data; a second processor module for producing pulse amplitude values corresponding to the number of events at the selected energy values; a third processor module for exponentially decaying the amplitude pulse values in time so as to produce a decaying digital tailpulse signal; and a fourth processor module for adding additional pulse amplitude values to the decaying digital tailpulse signal to update the digital tailpulse signal and simulate the pileup effect; and a digital-to-analog converter for converting said digital tailpulse signals and updates thereof into analog tailpulse signals.

Another aspect of the present invention includes a method of generating tailpulse signals comprising: pseudo-randomly selecting energy values from the energy spectrum data; producing pulse amplitude values corresponding to the number of events at the selected energy values; exponentially decaying the amplitude pulse values in time so as to produce a decaying digital tailpulse signal; adding additional pulse amplitude values to the decaying digital tailpulse signal to update the digital tailpulse signal and simulate the pileup effect; and converting said digital tailpulse signals and updates thereof into analog tailpulse signals.

Generally, the present invention is directed to a tailpulse signal generating/simulating apparatus, system, and method designed to produce electronic pulses which simulate tailpulses produced by a gamma radiation detector, such as for example Germanium, NaI, scintillator/photomultiplier tube (PMT), etc. detectors. In particular the apparatus operates to closely replicate the shape, i.e. rise-time, fall-time, and amplitude of the voltage pulses that would be produced by such detectors. In addition, the apparatus, system, and method of the present invention is also capable of simulating realistic tailpulse characteristics, including the pileup effect caused by the characteristic exponential decay of the detector pulses, and the random Poisson distribution pulse timing for any radioactive material such as, for example, Cesium137, Cobalt60, Europium152 or Plutonium, Americium241, etc. Thus by artificially generating such tailpulses, the need for radioactive material for calibrating and testing radiation detection/analysis equipment may be eliminated.

The two main hardware components of the tailpulse signal generator are a digital signal processor (DSP) such as a field programmable gate array (FPGA) module for computing tailpulse amplitudes and Poisson timing intervals between tailpulses, and a digital-to-analog converter (DAC) module for producing an electronic signal using the amplitude and pulse timing data provided by the DSP. Other components include a power supply, and for certain embodiments, an onboard user input/control interface which enables the invention to be used, for example, as a standalone tailpulse simulation device.

It is appreciated that the term "digital signal processor" and "DSP" is generically used herein and in the claims to denote any device or process, regardless of type, class, construction, re-configurability, or specialized functionality, capable of performing digital signal processing, i.e. the processing of digital/digitized signals. In particular it is not limited to a special-purpose processor or CPU (Central Processing Unit) that provides ultra-fast instruction sequences that are commonly used in math-intensive signal processing applications (such as for example a math coprocessor). Furthermore, it is appreciated that while the DSP of the present invention is preferably a FPGA module, other digital signal processing means, either hardware or software, may be utilized, e.g. general purpose microprocessors, programmable digital signal processors, PROM, CPLD, PAL, etc. It is appreciated therefore that references to FPGA and FPGA module in the following discussion is illustrative of DSP's generally as it performs the functions described below, and is also not intended to be limiting.

The DSP is programmed or otherwise configured to receive data files associated with a gamma energy spectrum (of a radioactive material of interest) which was previously digitally analyzed and formatted by a spectrum analyzer preferably according to a method described in the publication entitled, "An Efficient Method for Generating Discrete Random Variables with General Distributions" by Alastair J. Walker in ACM Transactions on Mathematical Software, Vol. 3, No. 3, September 1977, Pages 253-256, incorporated by reference herein in its entirety. This method, hereinafter "Walker algorithm," produces two numeric arrays which are capable of being processed by the DSP to produce the tailpulse amplitudes that will regenerate the original gamma energy spectrum. Furthermore, the analyzed data files can be received directly from the spectrum analyzer, e.g. a personal computer (PC), a dedicated processor or CPU, or other means known in the art for performing data analysis and digital formatting, or from data storage containing pre-analyzed and formatted spectrum data.

Upon receiving the analyzed data files, the DSP digitally processes the data files by performing two related processes/algorithms to produce digital values corresponding to the amplitude and timing of the tailpulses. In the first algorithm, the DSP generates random amplitude pulses corresponding to the energy spectrum or histogram by pseudo-randomly selecting an energy value from the received histogram data file and producing a number of pulse amplitude values corresponding to the number of events at that energy value. And the second algorithm uses the pulse amplitude value from the first algorithm and exponentially decays (attenuates) the value in time while outputting the digital value to the DAC, to produce the simulated tailpulse. Furthermore, while decaying the tailpulse exponentially, the second algorithm adds new pulses from the first algorithm to the decaying tailpulse in a pseudo-random sequence, to simulate the pileup effect that would be produced by the Germanium or scintillation detectors.

V. BRIEF DESCRIPTION OF THE DRAWINGS

The accompanying drawings, which are incorporated into and form a part of the disclosure, are as follows:

FIG. 8 shows exemplary C-structures of messages transmitted from the PC to the FPGA.

FIG. 9 is a continuation of the exemplary C-structures of FIG. 8.

VI. DETAILED DESCRIPTION

A. Hardware Configuration

Figure 1:
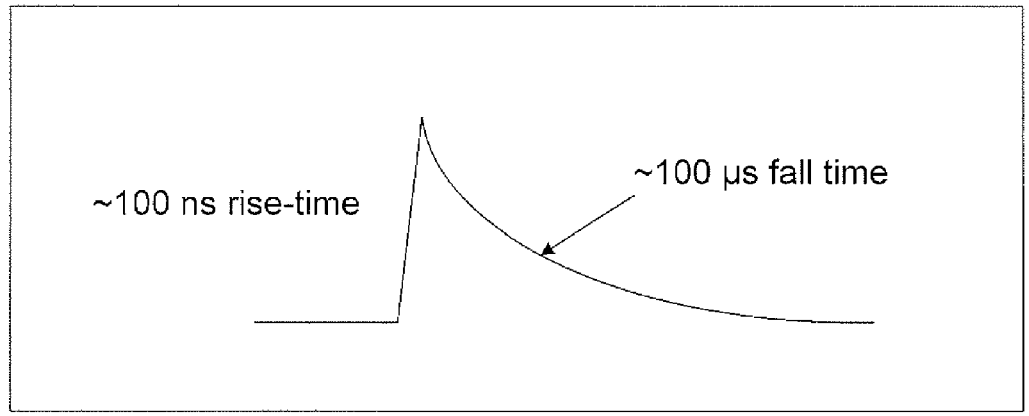
FIG. 1 is a graph of a single positive tailpulse showing characteristic rise and fall times.
Figure 2:
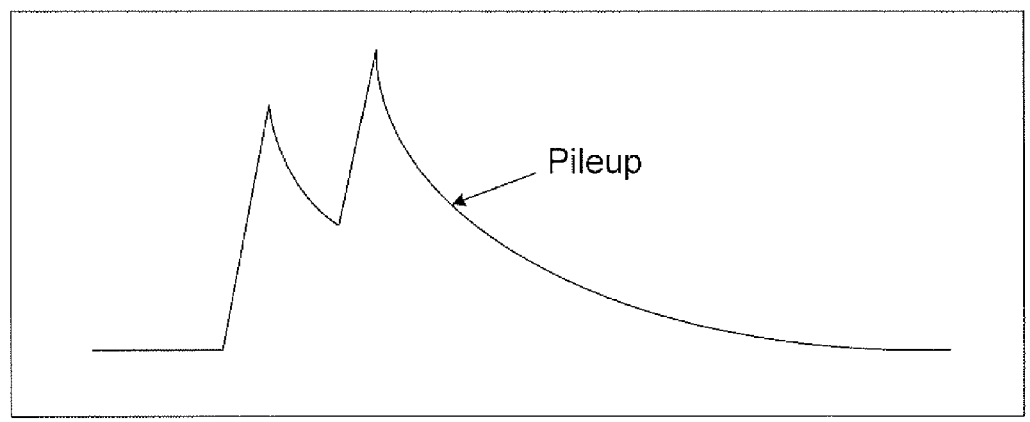
FIG. 2 is a graph of two positive tailpulses illustrating the pileup effect.
Figure 3:
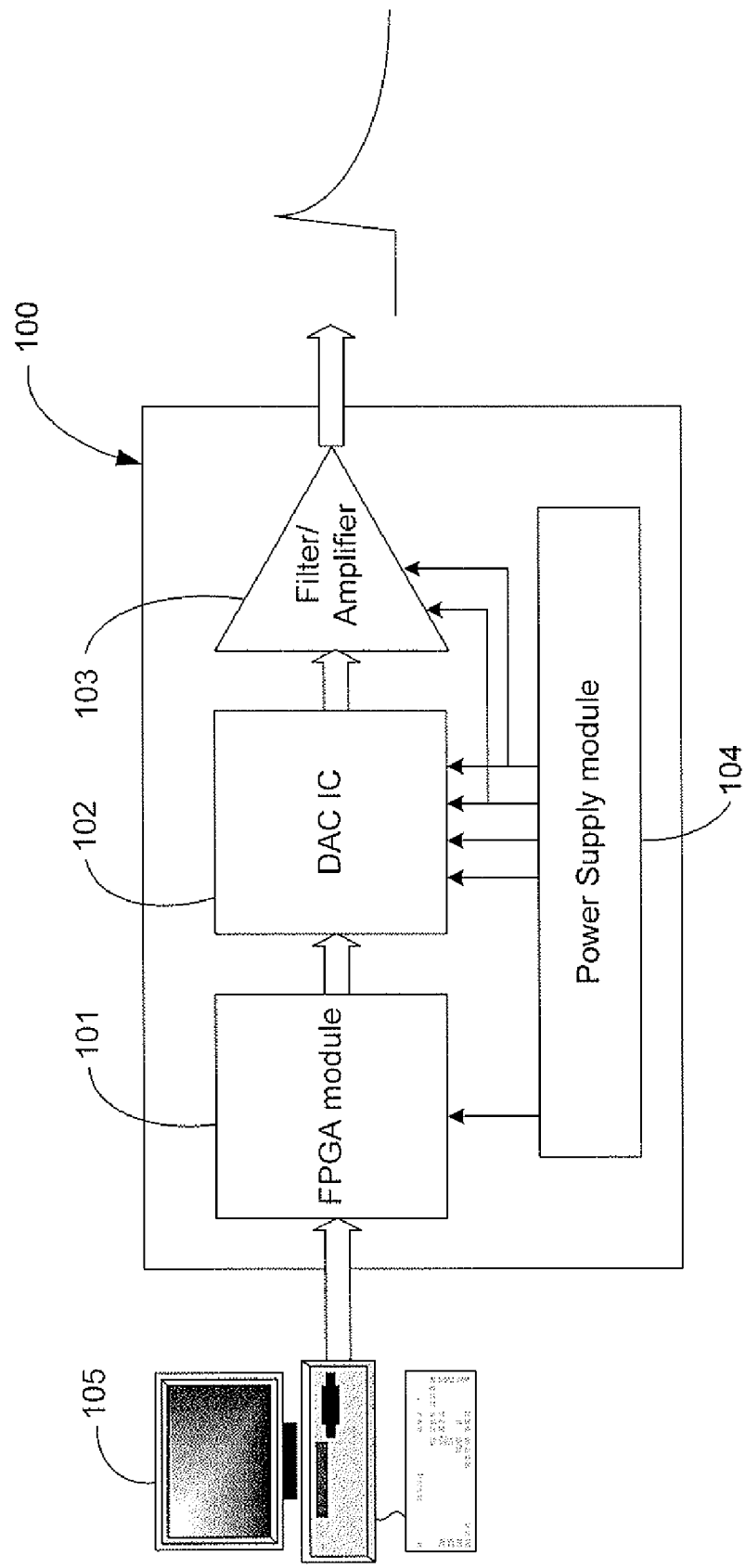
FIG. 3 is a schematic view of a first exemplary embodiment of the tailpulse signal generator of the present invention.

Turning now to the drawings, FIG. 3 shows a first exemplary embodiment of the tailpulse signal generator apparatus of the present invention, generally indicated at reference character 100. The apparatus is shown having a an FPGA module 101 for digital signal processing and a DAC module including a DAC integrated circuit (IC) 102 and an operational amplifier (opamp) IC 103 preferably having two opamps for producing both positive and negative output voltage pulses, although only one pulse is shown in FIG. 3. Additionally, the apparatus is also shown having a power supply module 104 which provides power to the apparatus as known in the art, such as by a power cable (not shown) for connecting to an external power source or by onboard batteries. And a personal computer (PC) 105 is also shown operably connected to the FPGA module 101 so as to transfer, transmit, or otherwise provide data files of the analyzed gamma energy spectrum of the radioactive material of interest, e.g. Cs137, to the FPGA, including, for example, a gamma energy spectrum or histogram, and number of events vs. event (energy) amplitude, as well as other command and data messages to be described in greater detail below.

An exemplary hardware construction for the tailpulse signal generator of FIG. 3 is now described. In the exemplary construction, the FPGA module 101 is an Insight-Electronics/Xilinx model DS-V2LC, manufactured by Xilinx Inc. of San Jose, Calif., which is a COTS (commercial off the shelf) FPGA evaluation module for the Xilinx model XC2V1000 FPGA IC included on the evaluation module. The XC2V1000 FPGA IC is a 1 million system-gate FPGA IC having 720 kBits of on-chip RAM for data storage (i.e. where the data files transmitted from the PC are stored). Also on the FPGA evaluation module are a flash Programmable Read Only Memory (PROM), power regulators, a 32 MB static memory (RAM) IC, 24 MHz and 100 MHz oscillator IC's, an eight position dual-inline switch (DIP), a DB-9 connector for serial RS232 interfacing and other connector pins for programming the PROM and for outputting data signals to the DAC. And for processing the data to produce tailpulses are forty 18-bit×18-bit high-speed 2's complement multipliers.

In the exemplary construction, the DAC module, including 102 and 103 in FIG. 3, is a COTS DAC evaluation board model AD768-EB, available from Analog Devices of Norwood, Mass The main components of the AD768-EB are (1) the AD768 16-bit, 30 million samples/sec (MSPS) D/A Converter IC and (2) two operational amplifier (opamp) IC's. Because the AD811 current-mode type opamps originally installed on the AD768-EB evaluation board were not amenable to output signal filtering, they were replaced with Ad9631 voltage feedback opamps. Two such opamps are provided to produce a positive output tailpulse and a negative output tailpulse. In order to reduce the amplifier gain of the AD768-EB, the 24.9 Ohm shunt resistors were replaced with 14.7 Ohm resistors and the 500 Ohm feedback resistors were replaced with 100 Ohm resistors to effectively reduce the effective amplifier gain from 5× to approximately 0.64×. This amplifier gain reduction, in addition to applying a calibration factor to the FPGA code, is required to match the DAC module output to the Cs137 peak at 661.7 keV. Also 470 pF silvermica capacitors were paralleled across the 100 Ohm feedback resistors to slow the DAC output risetime to approximately 100 ns. To zero the DAC output voltage baseline, a 1000 Ohm resistor was installed at the reference voltage input to the opamps. And finally, to series match the DAC output to a 50 Ohm RG-58 cable, 51.1 Ohm resistors were installed across the JP1 and JP5 terminals.

And power for the FPGA and DAC modules of the tailpulse signal generator are provided by a suitable power supply 104, such as for example, Acopian Corporation model 5EB50 5 Volt 0.5 A DC and model DB5-25+/−5 Volt 0.25 A DC supplies from 105-125 VAC, 47 to 420 Hz single phase mains. All components are wired in a manner known in the art for connecting component parts, e.g. a flat (ribbon) cable between the Xilinx XC2V1000 module and the Analog Devices AD768-EB DAC module.

Figure 4:
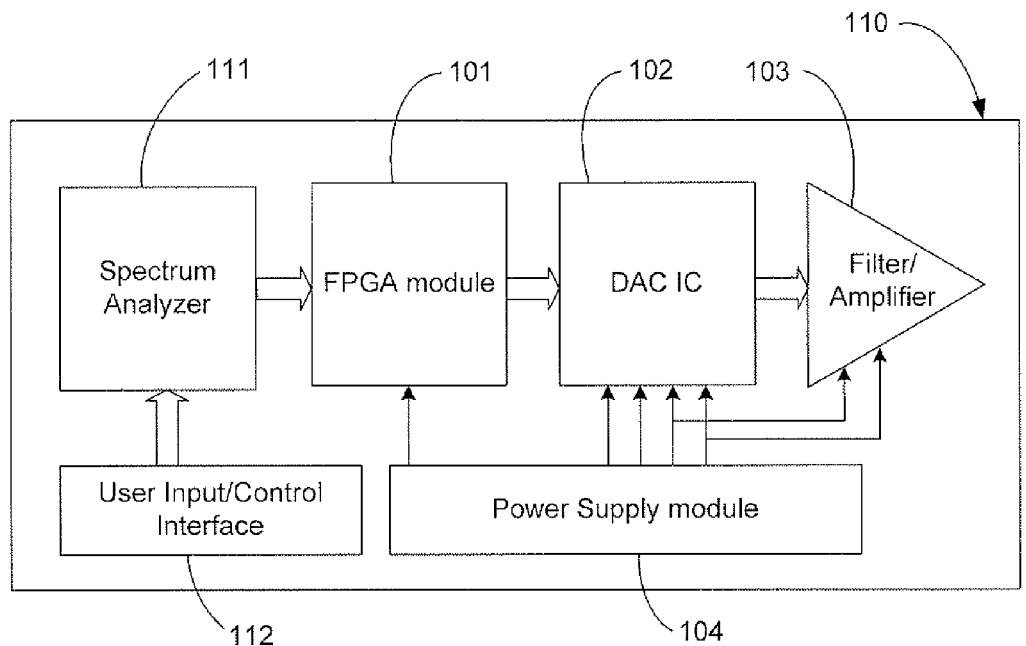
FIG. 4 is a schematic view of a second exemplary embodiment of the tailpulse signal generator of the present invention.

FIG. 4 shows a second exemplary embodiment of the tailpulse generator apparatus, generally indicated at reference character 110, and configured for standalone operation. Similar to FIG. 3, the apparatus is shown having an FPGA module 101, a DAC integrated circuit (IC) 102, an operational amplifier (opamp) IC 103, and a power supply module 104. In addition, the apparatus 110 also includes an on-board spectrum analyzer shown generically at 111 which performs the spectrum analysis preferably according to the previously describe Walker algorithm. A gamma spectrum to be digitally analyzed may be provided through the user input/control interface 112 for analysis by the spectrum analyzer 111 which is a second DSP, such as an onboard PC. And in this embodiment, the user input/control interface 112 may also be used to control operation of the spectrum analyzer, FPGA, and the tailpulse generator generally. By bringing the spectrum analyzer onboard and providing a direct user interface, this embodiment of the tailpulse generator is capable of standalone operation, without requiring connectability to and data/control input from an offboard PC.

Figure 5:
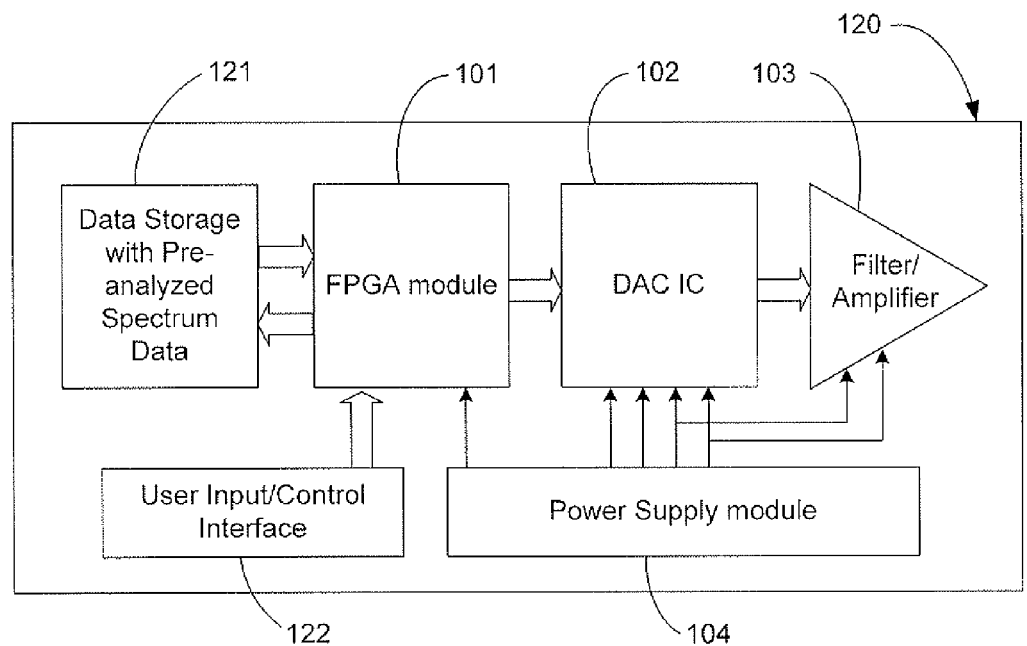
FIG. 5 is a schematic view of a third exemplary embodiment of the tailpulse signal generator of the present invention.

FIG. 5 shows a third exemplary embodiment of the tailpulse generator apparatus, generally indicated at reference character 120. Similar to FIGS. 3 and 4, the apparatus is shown having an FPGA module 101, a DAC integrated circuit (IC) 102, an operational amplifier (opamp) IC 103, and a power supply module 104. In addition, the apparatus 110 also includes an on-board data storage unit generically shown at 121 which stores pre-analyzed spectrum data and associated command information accessible for use by the FPGA module, with the FPGA module programmed to retrieve the data from the data storage unit 121. A user input/control interface 122 is provided for controlling the FPGA operation, such as data retrieval from data storage and subsequent processing, and the generator apparatus as a whole as a standalone unit similar to the embodiment of FIG. 4.

B. Tailpulse Signal Generation

Figure 6:
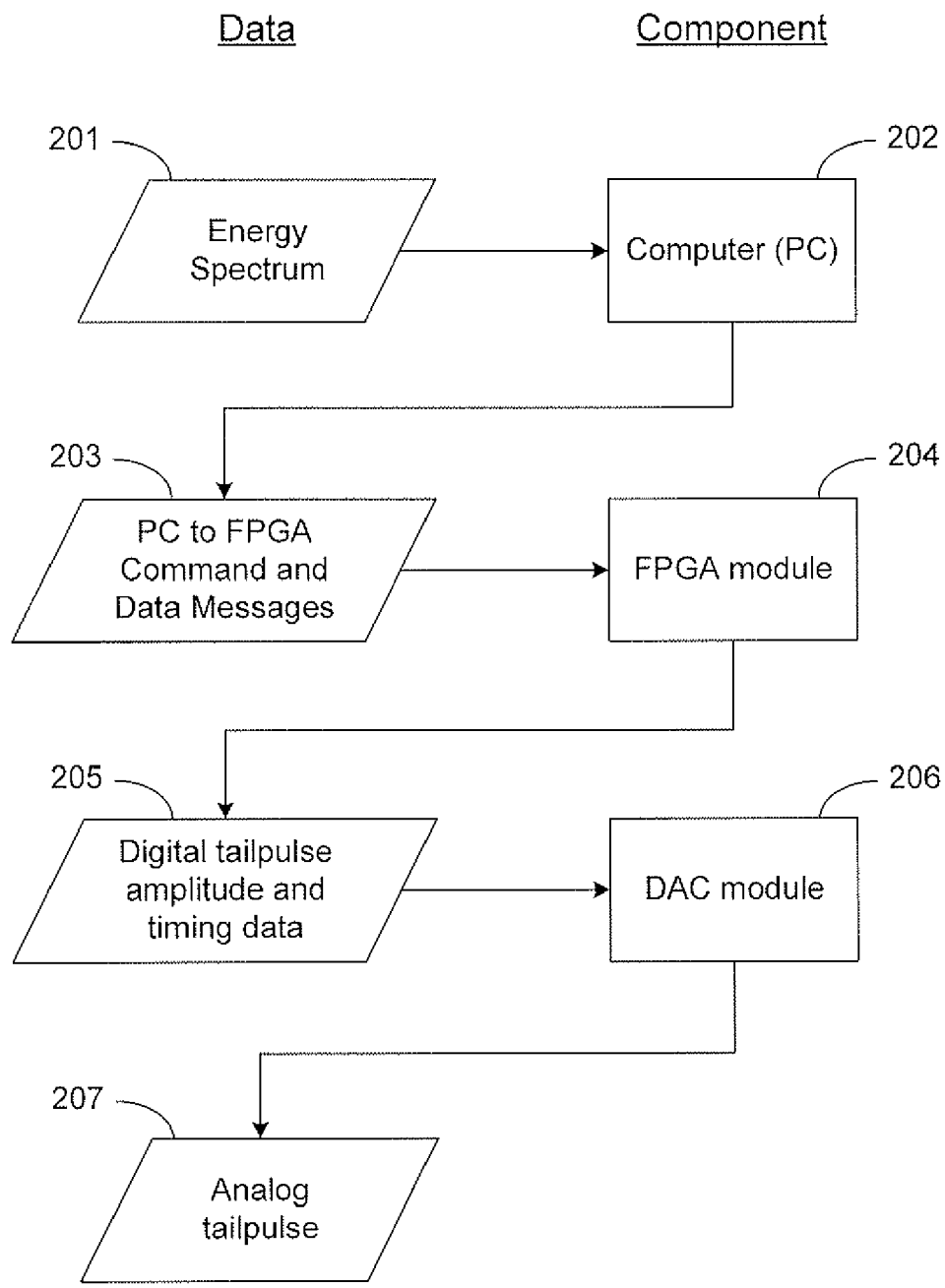
FIG. 6 is a flow chart generally illustrating operation of the exemplary tailpulse signal generator shown in FIG. 3.

FIG. 6 shows a simplified overview flowchart of the tailpulse generation process as related to the hardware embodiment of FIG. 3, and organized to show data elements on the left column, and hardware components on the right column. First an energy spectrum 201, such as measured/obtained from radiation detection equipment, is provided to a spectrum analyzer, such as PC 202, to be analyzed thereby. The spectrum analyzer then performs digital spectrum analysis and formatting preferably according to the Walker algorithm and prepares command and data messages. The command and data messages 203 (including two integer arrays, a timing array, seeds for two pseudo-random number generators, a calibration factor, and messages to start, stop and reset the FPGA operation) are then transmitted to the FPGA module 204. The FPGA module then performs two different processes to produce digital amplitude and timing values 205 which are sent to the DAC module 206 to produce an analog voltage pulse, i.e. the tailpulse 207.

Initially, the PC 202 (or other spectrum analyzer as described herein) is used to analyze the spectrum according to Walker's algorithm and to produce two integer data files, the F array and the IA array. These are transmitted to the FPGA 204 for further processing. In particular, the PC transmits serial RS232 messages to the FPGA comprising the following command and data messages: (1) the point F and IA arrays from the Walker algorithm, (2) a 128-point Poisson random timing array, (3) seeds for two pseudo-random number generators, (4) a calibration factor and (5) messages to start, stop and reset the FPGA operation. Exemplary C-structures of those messages are shown in FIGS. 8 and 9, where msgChecksum is the XOR of the bytes in the message, the characters startChar1 and startChar2 are both hexadecimal 01, messageLength is size of (structure), NCHAN is 8192. UINT16 command is ASCII G for begin pulse generation, ASCII S for restart pulse generation, ASCII s for stop pulse generation, ASCII R for reset FPGA, ASCII I to indicate the IA array follows, ASCII F to indicate the F array follows, ASCII D to indicate the Poisson timing array follows, ASCII C to indicate the 32-bit calibration factor follows, ASCII A to indicate the seed for the UA pseudo-random number generator follows, ASCII B to indicate the seed for the UB pseudo-random number generator follows.

As mentioned in the Summary, the FPGA module is programmed to execute two algorithms to produce digital numbers corresponding to the amplitude and timing of tailpulses and output the digital numbers to the DAC, which then generates the tailpulses, i.e. analog voltages, corresponding to the digital numbers from the FPGA.

The first algorithm performed by the FPGA generates random amplitude pulses corresponding to the energy spectrum or histogram by pseudo-randomly selecting an energy value from the histogram data file and producing a number of pulse amplitude values corresponding to the number of events at that energy value. In particular, the FPGA processes the F and IA integer arrays similar to the GETONE subroutine in Walker's paper to produce tailpulse amplitudes that will regenerate the original spectrum. In Walker's algorithm, the F array is a floating-point array. The floating-point array was converted to an array of 32-bit integers to allow integer processing in the FPGA. Since the input spectra are composed of 8192 points, the F and IA arrays are arrays of 8192 values. In the previously described exemplary hardware configuration related to FIG. 3, the timing clock for the FPGA operates at 24 MHz, allowing the FPGA to update the tailpulse signals at 12 MHz, or approximately 80 nanoseconds per update to the DAC.

It is notable that the timing intervals in which the first algorithm produces new tailpulses are random Poisson timing intervals, since the timing of gamma pulses, like other real-life processes can be approximated by a Poisson distribution. Thus the time between tailpulses is approximately:

$$\Delta t = \frac{1}{f} \log_e U_i$$

where f is the average pulse frequency and $U_i$ are independent pseudo-random variables. For the FPGA with a clock rate of 24 MHz, the number of clock cycles between tailpulses is:

$$N = \frac{24 \times 10^6}{f} \log_e(U_i).$$

To set up the Poisson random timing of the tailpulses in the present invention, a third 128-point array for the tailpulse Poisson timing is produced in the PC and transmitted to the FPGA. This timing array is an array of natural logarithms divided by the average pulse rate selected for the tailpulses as shown above, modified slightly to allow for a minimum time interval of 3 µs, which is the minimum time interval that can be produced by the present implementation of the FPGA code. In this manner, while the FPGA computes the tailpulse amplitudes, random Poisson timing intervals are also produced using a pseudo-random number generator to select a time interval from the natural logarithm table transmitted to the FPGA from the PC to produce Poisson timing intervals between tailpulses.

And in the second algorithm, the FPGA is programmed to attenuate the pulse amplitudes obtained from first algorithm to exponentially decay the pulse amplitude value in time while outputting the valued to the DAC to produce the tailpulse. Preferably the amplitudes are attenuated in successive samples at an 8 MHz rate to produce the exponentially decayed pulse. Furthermore, while decaying the tailpulse exponentially, the second algorithm adds the new pulses (generated at random Poisson time intervals by the first algorithm) to the old decaying tailpulse, and then exponentially decaying the resulting signal. In this manner, the first and second algorithms implemented by the FPGA operated to simulate the pileup effect.

Figure 7:
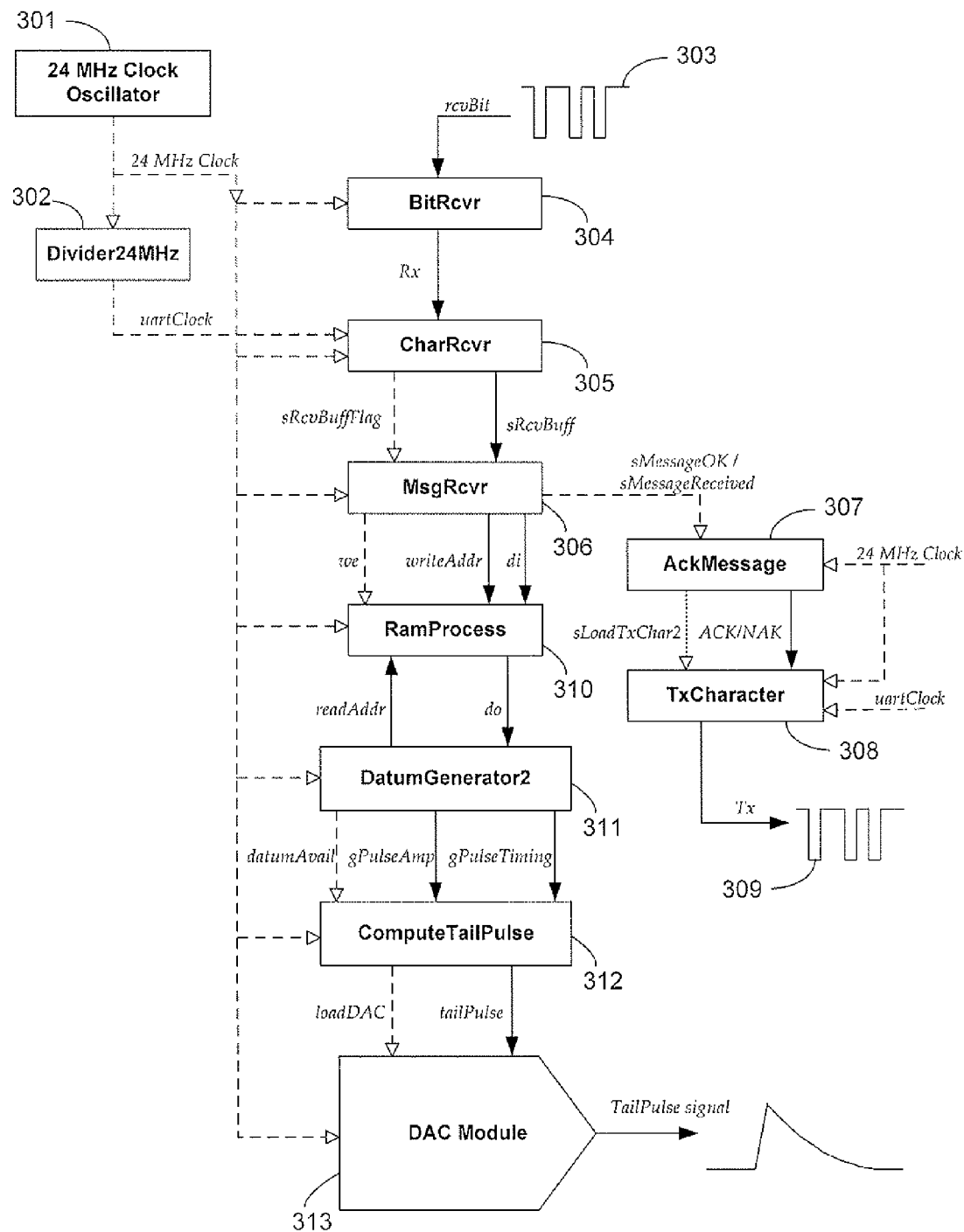
FIG. 7 is a flow chart of an exemplary VHDL code for controlling the digital signal processor of the tailpulse signal generator of the present invention.

The FPGA IC of the present invention is preferably configured to perform the tailpulse generating steps described above using code written in VHSIC Hardware Description Design Language (VHDL). FIG. 7 shows a flowchart of an exemplary VHDL code written for the previously described exemplary hardware construction associated with FIG. 3, and having process modules which generate the tailpulses for simulation of gamma pulse voltages produced by a Germanium or Photomultiplier detector. The algorithm of the VHDL code includes a number of process modules which cause the FPGA module to receive data files from the spectrum analyzer, e.g. a PC, and process the data files to produce the tailpulse output through the DAC. In particular, the process modules generate clock signals, receive and store data from the PC, compute the pulse amplitudes and the pulse timing and exponentially decay the pulse amplitudes to produce tailpulses. Furthermore, these process modules operate independently and simultaneously, synchronized and coordinated by means of flags or semaphores.

Divider 24 Mhz module 302 uses the DS-V2LC's on-board 24 MHz oscillator 301 to produce uartClock, the 923 kHz clock used to read-in the data from the PC serially at 57.6 kBaud.

BitRcvr module 304 is the serial bit receiver process, synchronizing the serial data bits from the PC to the 24 MHz clock of the FPGA. The serial receive bits, named rcvBit, shown at 303, are provided as input to the FPGA through an RS232 to TTL level converter on the DS-V2LC module. rcvBit includes, for example, the three data files from the spectrum analyzer are stored in the FPGA RAM memory. Also, the FPGA receives two "seeds" for two of the three pseudo-random number generators (PRNG's) required in the execution of Walker's GETONE algorithm. The outputs of BitRcvr 304 are the synchronized receive bits named Rx.

CharRcvr module 305 forms the serial bits, Rx, received from the PC into bytes, sRcvBuff, for subsequent reception by MsgRcvr module 306.

MsgRcvr module 306 parses serial messages from the PC and makes the received characters available for storage in the XC2V1000's on-chip RAM. Those messages comprise commands to the FPGA including Start, Stop and Reset and data arrays comprising the F and IA arrays and the Poisson random timing file, seeds for the two pseudo-random number generators used for the pulse amplitude production and the calibration factor for the pulse amplitudes. Message characters, sRcvBuff, are received from CharRcvr 305 and MsgRcvr 306 verifies the XOR byte checksum of the message and returns an acknowledge (ACK) or not-acknowledge (NAK) message to the PC by use of the AckMessage module 307. MsgRcvr 306 signals the reception of a valid message with the semaphore sMessageOK and the reception of an invalid message by the semaphore sMessageReceived.

AckMessage module 307 loads a single ACK/NAK character into VHDL signal sTxChar2 for transmission back to the PC in case of a valid/invalid message received from the PC. TxCharacter module 308 transmits the character to the PC.

TxCharacter module 308 transmits a single character to the PC, converting a byte character, sTxChar2, to a serial RS232 bitstream using output bit Tx, shown at 309.

RamProcess module 310 accepts characters from MsgRcvr and stores the characters in the XC2V1000's on-chip RAM according to the RAM address supplied by MsgRcvr 306. The data characters are stored for subsequent processing by DatumGenerator2 module 311.

DatumGenerator2 module 311 generates test pulse amplitudes and simulated gamma detector voltage pulse amplitudes according to Walker's GETONE algorithm. The generated test pulses include a sequence of pulses at hexadecimal amplitudes of 3000, 1000, 4000, 1000, 5000, 9000, 2000, 6000, 5000, 4000 sequence with clock timing intervals hexadecimal 4000, 5000, 6000, 2000, 9000, 5000, 1000, 4000, 1000, 3000 with pileup. Other test pulse sequences include the generated pseudo-random numbers UA, UB and UD and the IA array received from the PC and a constant amplitude pulse and finally a ramp sequence of pulses. The test pulses can be selected by means of an eight-position Dual-Inline-Package (DIP) switch module. All switches of the DIP-switch module in the off position selects normal tailpulse generation.

The normal gamma pulse generation routine for the actual simulated gamma voltage pulses, selected by all DIP-switches in the OFF position, starts by awaiting the reception from the PC of the 128-point, 32-bit Poisson random timing array, the calibration factor word calFactor, the F array, the IA array, the two seeds for the UA and UB pseudo-random number generators and begins generating the pulse amplitudes when the start message is received from the PC.

When the previous pulse times out, according to the Poisson timing value and TimeoutDatum process module (not shown) requests a new pulse amplitude by asserting datumReq, generation of the next pulse amplitude begins by generating the three pseudo-random numbers, the 13-bit UA used to address the F array, the 32-bit UB used to compare with values read from the F array and the 7-bit pseudo-random number UD used to select from the 128-point Poisson random timing array. These pseudo-random numbers are generated using the Linear Feedback Shift-Register (LFSR) as described in the Xilinx XAPP 052 application note (Alfke, P., Efficient Shift Registers, LFSR Counters, and Long Pseudo-Random Sequence Generators, Xilinx Corporation application note XAPP 052, Jul. 7, 1996). Successive steps in the DatumGenerator2 module 311 retrieve the Poisson random timing value Poisson, the F array value (using UA as the address) and, if appropriate from Walker's algorithm, the IA value from the XC2V1000 RAM. The result of the last steps is the un-calibrated pulse amplitude IX. The next steps multiply IX by the calibration factor, calFactor, and finally asserts datumAvail and produces gPulseAmp to be used in the ComputeTailPulse module 312 and gPulseTiming, the Poisson timing interval between pulses. In this last step, a fixed 1 kHz timing rate can be selected by switching on Dip-Switch #8 in lieu of the Poisson timing interval for testing purposes.

When TimeoutDatum detects that a new pulse amplitude value is available by seeing that datumAvail was asserted, it copies gPulseAmp to pulseAmpVector and gPulseTiming to timeoutVector. Then TimeoutDatum counts down the Poisson random timing value, gPulseTiming, at the rate of one decrement per 24 MHz clock cycle until the count reaches zero at which time TimeoutDatum asserts newPulseAvail and datumReq. The signal newPulseAvail alerts Process ComputeTailPulse that a new pulse amplitude value newPulseAmp (from pulseAmpVector) is available for outputting through the DAC.

ComputeTailPulse module 312 begins by computing the exponential decay of the tailpulse amplitude, tailpulse, by subtracting a portion of the previous tailpulse value, equivalent to a multiplication of the tailpulse by 0.998. The value 0.998 was selected to produce approximately a 100 μs tailpulse exponential decay time. After the subtraction, the next available pulse amplitude value, newPulseAmp, is added to tailpulse to effect pileup and then finally tailpulse is output to the DAC 313 to produce the tailpulse signal.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

We claim:

1. A tailpulse signal generator comprising:
   digital signal processor (DSP) for generating digital tailpulse signals from gamma energy spectrum data, said DSP adapted to: pseudo-randomly select energy values from the spectrum data and pseudo-randomly select pulse time intervals; produce digital pulse amplitude values corresponding to the number of events at the selected energy values and at the selected time intervals; exponentially decay the pulse amplitude values in time; at each selected time interval, add a new pulse amplitude value to an old exponentially decaying amplitude pulse value; and exponentially decay the resulting pulse amplitude value in time to simulate the pileup effect;
   a digital-to-analog converter (DAC) operably connected to receive said digital tailpulse signals from said DSP and produce analog voltage signals therefrom to simulate tailpulses characteristic of the gamma energy spectrum; and
   means for supplying power to said tailpulse signal generator.

2. The tailpulse signal generator of claim 1,
   wherein the computer processor means comprises an FPCA module.

3. The tailpulse signal generator of claim 1,
   wherein said DSP is adapted to: receive gamma energy spectrum data including two numeric arrays characterizing the gamma energy spectrum and a Poisson timing array comprising natural logarithms of an independent pseudo-random variable; and generate pseudo random variables for selecting the energy values and the pulse timing intervals.

4. The tailpulse signal generator of claim 3,
   wherein said DSP is adapted to receive command messages and process said spectrum data according to said command messages.

5. The tailpulse signal generator of claim 4,
   wherein said DSP is adapted to receive the spectrum data from an offboard spectrum analyzer.

6. The tailpulse signal generator of claim 1,
   further comprising: a spectrum analyzer adapted to analyze an energy spectrum of a radioactive material to produce the spectrum data; and a user input/control interface for controlling said spectrum analyzer and said tailpulse signal generator.

7. The tailpulse signal generator of claim 1,
   further comprising: a data storage unit having spectrum data of at least one radioactive material stored thereon and accessible by said DSP; and a user input/control interface for controlling said DSP and said tailpulse signal generator.

8. A method of generating tailpulse signals comprising:
   controlling a digital signal processor (DSP) to pseudo-randomly select an energy value from energy spectrum data;
   controlling the DSP to pseudo-randomly select a pulse time interval;
   controlling the DSP to produce a pulse amplitude value corresponding to the number of events at the selected energy value;
   controlling the DSP to exponentially decay the pulse amplitude value in time;
   at the selected time interval, controlling the DSP to add a new pseudo-randomly selected pulse amplitude value to the exponentially decaying amplitude pulse value to produce a resulting pulse amplitude value;
   controlling the DSP to exponentially decay the resulting pulse amplitude value in time to simulate the pileup effect; and
   controlling a digital-to-analog converter (DAC) to produce analog voltage signals from the pulse amplitude values.

* * * * *